United States Patent
Tang et al.

(10) Patent No.: US 10,200,234 B2
(45) Date of Patent: Feb. 5, 2019

(54) MULTI-LEVEL SELF-ORGANIZING NETWORK COORDINATION

(75) Inventors: Haitao Tang, Espoo (FI); Clemens Suerbaum, Munich (DE); Henning Sanneck, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 353 days.

(21) Appl. No.: 14/375,178

(22) PCT Filed: Jan. 30, 2012

(86) PCT No.: PCT/EP2012/051398
§ 371 (c)(1),
(2), (4) Date: Jul. 29, 2014

(87) PCT Pub. No.: WO2013/113350
PCT Pub. Date: Aug. 8, 2013

(65) Prior Publication Data
US 2015/0026327 A1    Jan. 22, 2015

(51) Int. Cl.
*G06F 15/173*    (2006.01)
*H04L 12/24*    (2006.01)
(Continued)

(52) U.S. Cl.
CPC ............ *H04L 41/04* (2013.01); *H04L 41/022* (2013.01); *H04L 41/044* (2013.01); *H04W 84/18* (2013.01); *H04W 24/02* (2013.01)

(58) Field of Classification Search
CPC ..... H04L 41/12; H04L 41/042; H04L 41/044; H04W 84/18
See application file for complete search history.

(56) References Cited

U.S. PATENT DOCUMENTS

| | | | |
|---|---|---|---|
| 9,100,837 B2 * | 8/2015 | Futaki | .................... H04W 24/02 |
| 2003/0217129 A1 * | 11/2003 | Knittel | ................ H04L 41/0856 709/223 |

(Continued)

FOREIGN PATENT DOCUMENTS

| | | |
|---|---|---|
| CN | 102077684 A | 5/2011 |
| JP | 2010/268463 A | 11/2010 |

(Continued)

OTHER PUBLICATIONS

Nec Corporation: "Self Organizing Network: Nec's proposal for next-generation radio network management" Feb. 28, 2009, p. 1, right hand column-p. 2 right-hand column.

(Continued)

*Primary Examiner* — Liang Che A Wang
*Assistant Examiner* — Ayele F Woldemariam
(74) *Attorney, Agent, or Firm* — Squire Patton Boggs (US) LLP (57) ABSTRACT

There are provided measures for realizing multi-level self-organizing network coordination, including self-organizing network coordination procedures. Such measures exemplarily comprise communication of a notification for self-organizing network coordination, which notifies an action of at least one self-organizing network function at a lower management level, from the lower management level of a self-organizing network to a higher management level of the self-organizing network, either before the action is actually performed or after the action has actually been performed, and coordination of the notified action in terms of self-organizing network coordination at the higher management level.

14 Claims, 5 Drawing Sheets

(51) Int. Cl.
*H04W 84/18* (2009.01)
*H04W 24/02* (2009.01)

(56) References Cited

U.S. PATENT DOCUMENTS

| | | | | |
|---|---|---|---|---|
| 2011/0061063 | A1* | 3/2011 | Suerbaum | H04L 41/0806 |
| | | | | 719/316 |
| 2011/0105139 | A1* | 5/2011 | On | H04W 16/10 |
| | | | | 455/453 |
| 2011/0188378 | A1* | 8/2011 | Collins | H04L 41/042 |
| | | | | 370/236 |
| 2012/0250565 | A1* | 10/2012 | Zhang | H04J 11/0053 |
| | | | | 370/252 |

FOREIGN PATENT DOCUMENTS

| | | | | |
|---|---|---|---|---|
| WO | 2010/104143 | A1 | 9/2010 | |
| WO | 2011/020753 | A1 | 2/2011 | |
| WO | WO 2011/020753 | A1 | 2/2011 | |
| WO | WO 2011072446 | A1 * | 6/2011 | .......... H04J 11/0053 |
| WO | 2012/110078 | A1 | 8/2012 | |
| WO | 2012/143055 | A1 | 10/2012 | |
| WO | 2013/071965 | A1 | 5/2013 | |

OTHER PUBLICATIONS

S. Hämäläinen et al LTE Self-Organising Networks (SON): Networks Management Automation for Operational Efficiency, Wily ISBN 978-1-1199-7067-5 chapter 9; chapter 10.

International Search Report dated Nov. 28, 2012 corresponding to International Patent Application No. PCT/EP2012/051398.

ETSI TS 132 501 V10.0.0 (May 2011), Technical Specification, Universal Mobile Telecommunications System (UMTS); LTE; Telecommunication management; Self-Configuration of network elements; Concepts and requirements (3GPP TS 32.501 version 10.0.0 Release 10), May 1, 2011, XP014065233, 19 pp.

3GPP TS 32.500 V11.1.0 (Dec. 2011); 3rd Generation Partnership Project; Technical Specification Group Services and System Aspects; Telecommunication Management; Self-Organizing Networks (SON); Concepts and requirements (Release 11).

3GPP TS 32.522 V11.1.0 (Dec. 2011); 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11).

Japanese Office Action Notification of Reasons for Rejection application No. 2014-555086 dated Aug. 26, 2015.

State Intellectual Property Office, P.R. China, Office Action corresponding to Chinese Patent Appln. No. 201280072137.7, dated Jun. 9, 2017.

3GPP TS 32501 V10.0.0 (Mar. 2011); 3rd Generation Partnership Project; Technical Specification Group Services and System Aspects; Telecommunication Management; Self-Configuration of Network Elements; Concepts and requirements (Release 10), pp. 1-17.

Chinese Office Action issued in corresponding Chinese Patent Application No. 201280072137.7 dated Sep. 18, 2018.

* cited by examiner

MULTI-LEVEL SELF-ORGANIZING NETWORK COORDINATION

FIELD

The present invention relates to multi-level self-organizing network coordination. More specifically, the present invention exemplarily relates to measures (including methods, apparatuses and computer program products) for realizing multi-level self-organizing network coordination.

BACKGROUND

The present specification basically relates to the self-organizing networks (SON), and especially to self-organizing network (SON) coordination.

Such SON coordination is specifically applicable in multi-vendor/release networks which are typically organized into multiple domains to be operated and managed. The network elements of the same vendor/release are usually grouped into the same domain or domains so that they can be effectively operated and managed by a network operator. The same principle also applies to heterogeneous networks consisting of multiple radio access technologies (RATs) and multiple cell layers within these RATs, in which network elements of the same RAT/layer may be grouped into the same domain or domains, thus making such SON coordination applicable therein as well.

Due to the above organizational principle, which is applicable e.g. to multi-vendor/release networks and heterogeneous networks, SON functions of the network are located not only in different domains, but also at different levels in the OSS/OAM hierarchy. Namely, some of the SON functions locate at the network elements (NE), some of them locate at the domain managers (DM) or element managers (EM), while the others locate at the network manager (NM).

Such multi-level and multi-domain distribution of SON functions poses challenges to realization of an appropriate and effective SON coordination between these SON functions. In this regard, it is required to enable SON coordination in consideration of cross-level and cross-domain inter-dependencies (such as dependencies or conflicts) between respective SON functions.

The requirements of such appropriate and effective SON coordination relate to a SON coordination capability between domains, i.e. coordination of a NE/EM/DM-level function in a domain and another NE/EM/DM-level function in another domain, and a SON coordination capability between management levels, i.e. coordination of a NE/EM/DM-level function and a NM-level function.

In particular, at least no cross-level SON coordination capability is currently available in/for present communication systems.

Therefore, there is a need to enable realization of multi-level self-organizing network coordination facilitating an appropriate and effective SON coordination across different management levels and domains.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising issuing a notification for self-organizing network coordination, which notifies an action of at least one self-organizing network function at a lower management level, from the lower management level of a self-organizing network to a higher management level of the self-organizing network.

According to an exemplary aspect of the present invention, there is provided a method comprising receiving a notification for self-organizing network coordination, which notifies an action of at least one self-organizing network function at a lower management level, from the lower management level of a self-organizing network at a higher management level of the self-organizing network, and coordinating the notified action in terms of self-organizing network coordination at the higher management level.

In some embodiments, the coordinating can comprise collecting coordination-related information from the lower management level, derivable from the received notification, and/or combining coordination-related information from the lower management level, derivable from the received notification, with coordination-related information from the higher management level.

In certain embodiments, the notification comprises a self-organizing network coordination specific request, in which the notified action is an intended action intended to be performed by the at least one self-organizing network function at the lower management level, for which a self-organizing network coordination decision is requested from the higher management level, and which comprises coordination-related profile information of the at least one self-organizing network function.

In certain embodiments, the invention can also include making a self-organizing network coordination decision for the intended action in accordance with the coordination-related profile information of the at least one self-organizing network function at the lower management level, and issuing an operation for self-organizing network coordination, which includes the self-organizing network coordination decision for the intended action, to the lower management level, wherein the self-organizing network coordination decision corresponds to one of confirmation of the intended action, rejection of the intended action, and at least one action alternative to the intended action.

In certain embodiments, the notification comprises a self-organizing network coordination specific information, in which the notified action is a performed action having been performed by the at least one self-organizing network function at the lower management level, about which the higher management level is informed for self-organizing network coordination based thereon.

In certain embodiments, the invention can also include making a self-organizing network coordination decision for the performed action at the lower management level, and issuing an operation for self-organizing network coordination, which includes the self-organizing network coordination decision for the performed action, to the lower management level, wherein the self-organizing network coordination decision corresponds to one of at least one action alternative to the performed action and undoing of the performed action.

In certain embodiments, the lower management level is an element or domain manager level and the higher management level is a network manager level, or the lower management level is a network element level and the higher management level is an element or domain manager level, or the lower management level is a network element level and the higher management level is a network manager level.

In certain embodiments, the method is operable in a self-organizing network, and/or the method is operable at or by a network manager entity, and/or the method is operable at or by a self-organizing network coordination function at the higher management level, and/or the lower management level and the higher management level correspond to respective levels of an operations support system and/or respective operation and maintenance levels of a communication system, and/or the lower management level and the higher management level are linked over at least one of an Itf-N interface and an Itf-S interface.

According to an exemplary aspect of the present invention, there is provided an apparatus comprising an interface configured to communicate with at least another apparatus, a memory configured to store computer program code, and a processor configured to cause the apparatus to perform: issuing a notification for self-organizing network coordination, which notifies an action of at least one self-organizing network function at a lower management level, from the lower management level of a self-organizing network to a higher management level of the self-organizing network.

According to an exemplary aspect of the present invention, there is provided an apparatus comprising an interface configured to communicate with at least another apparatus, a memory configured to store computer program code, and a processor configured to cause the apparatus to perform: receiving a notification for self-organizing network coordination, which notifies an action of at least one self-organizing network function at a lower management level of a self-organizing network, from the lower management level at a higher management level of a self-organizing network, and coordinating the notified action in terms of self-organizing network coordination at the higher management level.

In certain embodiments, the apparatus can also be configured to perform collecting coordination-related information from the lower management level, derivable from the received notification, and/or combining coordination-related information from the lower management level, derivable from the received notification, with coordination-related information from the higher management level.

In certain embodiments, the notification comprises a self-organizing network coordination specific request, in which the notified action is an intended action intended to be performed by the at least one self-organizing network function at the lower management level, for which a self-organizing network coordination decision is requested from the higher management level, and which comprises coordination-related profile information of the at least one self-organizing network function.

In certain embodiments, the apparatus can also be configured to perform making a self-organizing network coordination decision for the intended action in accordance with the coordination-related profile information of the at least one self-organizing network function at the lower management level, and issuing an operation for self-organizing network coordination, which includes the self-organizing network coordination decision for the intended action, to the lower management level, wherein the self-organizing network coordination decision corresponds to one of confirmation of the intended action, rejection of the intended action, and at least one action alternative to the intended action.

In certain embodiments, the notification comprises a self-organizing network coordination specific information, in which the notified action is a performed action having been performed by the at least one self-organizing network function at the lower management level, about which the higher management level is informed for self-organizing network coordination based thereon.

In certain embodiments, the apparatus can also be configured to perform making a self-organizing network coordination decision for the performed action at the lower management level, and issuing an operation for self-organizing network coordination, which includes the self-organizing network coordination decision for the performed action, to the lower management level, wherein the self-organizing network coordination decision corresponds to one of at least one action alternative to the performed action and undoing of the performed action.

In certain embodiments, the lower management level is an element or domain manager level and the higher management level is a network manager level, or the lower management level is a network element level and the higher management level is an element or domain manager level, or the lower management level is a network element level and the higher management level is a network manager level.

In certain embodiments, the apparatus is operable in a self-organizing network, and/or the apparatus is operable as or at a network manager entity, and/or the apparatus is operable as or at a self-organizing network coordination function at the higher management level, and/or the lower management level and the higher management level correspond to respective levels of an operations support system and/or respective operation and maintenance levels of a communication system, and/or the lower management level and the higher management level are linked over at least one of an Itf-N interface or and an Itf-S interface.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise or be embodied as a (tangible) computer-readable (storage) medium or the like on which the computer-executable computer program code is stored, and/or the program may be directly loadable into an internal memory of the computer or a processor thereof.

Advantageous further developments or modifications of the aforementioned exemplary aspects of the present invention are set out in the following.

By way of exemplary embodiments of the present invention, there is provided multi-level self-organizing network coordination. More specifically, by way of exemplary embodiments of the present invention, there are provided measures and mechanisms for realizing multi-level self-organizing network coordination (in a cellular communication system).

Thus, improvement is achieved by methods, apparatuses and computer program products enabling/facilitating realization of multi-level self-organizing network coordination (in a cellular communication system).

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a LTE/LTE-Advanced communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

In particular, the present invention and its embodiments may be applicable in any (cellular) communication system and/or network deployment in which self-organizing network (SON) coordination facilitating an appropriate and effective SON coordination across different management levels and domains is applicable (e.g. due to its underlying organizational principle).

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) multi-level self-organizing network (SON) coordination (in a cellular communication system).

Figure 1:
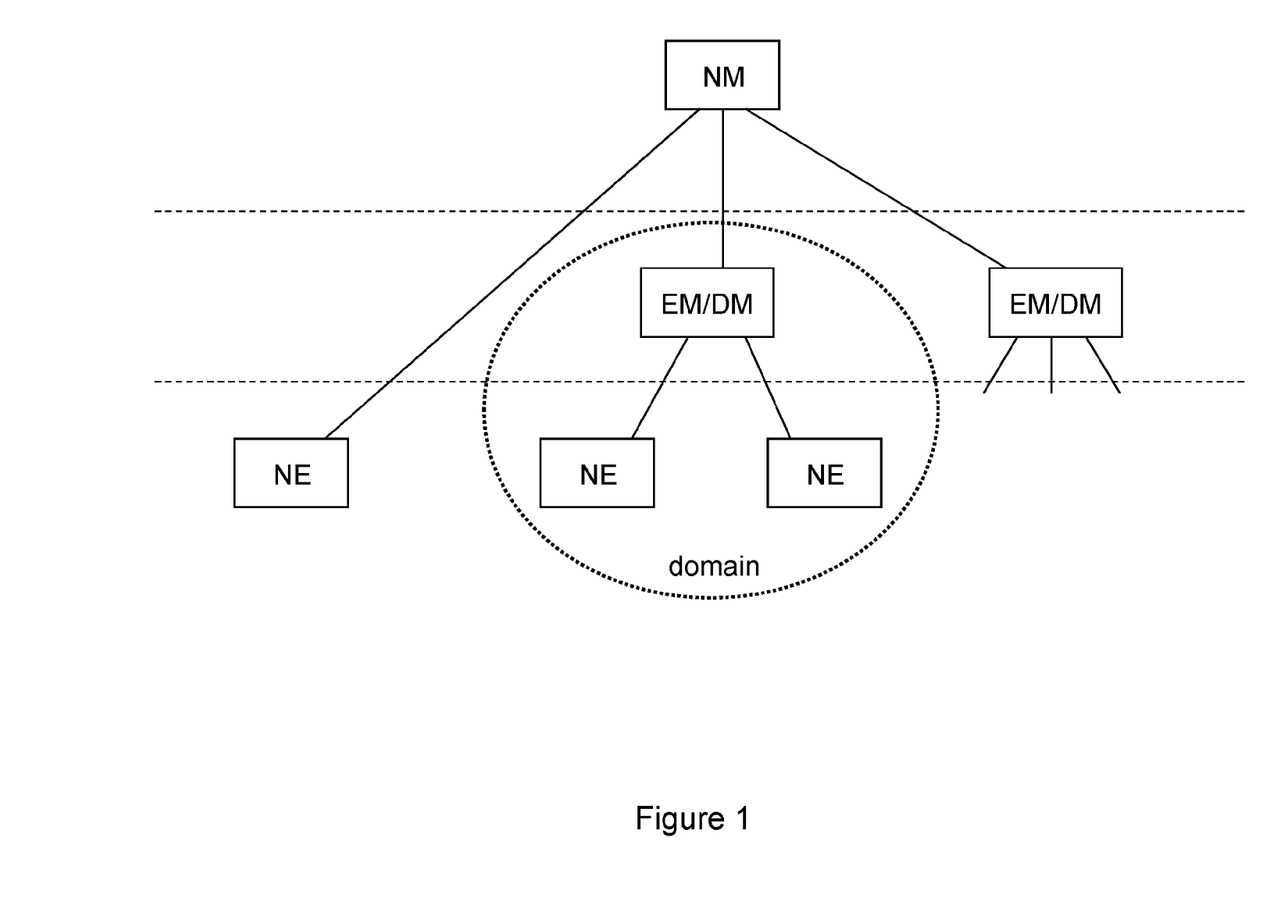
FIG. 1 shows a schematic diagram of a self-organizing network architecture, for/in which exemplary embodiments of the present invention are applicable.

FIG. 1 shows a schematic diagram of a self-organizing network architecture, for/in which exemplary embodiments of the present invention are applicable. In FIG. 1, the dashed horizontal lines indicate logical (SON) network levels, which may also be referred to as management levels of the (SON) network.

As shown in FIG. 1, it is exemplarily assumed that two network elements (NE) such as base stations or access nodes are connected with an element manager (EM) and/or a domain manager (DM), which may be the case via an Itf-S interface. For example, an element manager may specifically be configured to govern a single network element (within a domain), and a domain manager may specifically be configured to govern multiple (e.g. all) network elements (within a domain). The EM/DM and its two connected NEs are exemplarily assumed to represent (or belong to) a SON management domain. The EM/DM (as well as another exemplarily assumed EM/DM, for which NE connections are only indicated) are connected with a network manager (NM), which may be the case via an Itf-N interface. By virtue of such cross-level connections, multi-level SON coordination is feasible.

As also shown in FIG. 1, it is exemplarily assumed that a network element (NE) may also be directly connected with a network manager (NM), which may be the case via an Itf-S interface.

In such SON architecture, although not illustrated in FIG. 1, the NEs may also be connected with each other, and/or the EMs/DMs may also be connected with each other. By virtue of such intra-level connections, single-level (intra- or multi-domain) SON coordination would also be feasible.

Herein, it is assumed that the NEs represent a network element (NE) level, the EMs/DMs represent an element manager (EM) or domain manager (DM) level, and the NM represents a network manager (NM) level.

For exemplary embodiments of the present invention, it may be assumed to be transparent whether a SON function is located at the NE level, or the EM/DM level. Such assumption is based on the SON coordination pre-requisite that any activity of a NE-level function is to be exposed to the EM/DM level.

According to exemplary embodiments of the present invention, as described below, reference is mainly made to a lower management level and a higher management level. Referring to FIG. 1, a lower management level may be an EM or DM level while a higher management level may be a NM level, or a lower management level may be a NE level while a higher management level may be an EM or DM level, or a lower management level may be a NE level while a higher management level may be a NM level.

That is to say, exemplary embodiments of the present invention may be applicable to the Itf-S interface and/or the Itf-N interface. The applicability of one or both of these interfaces may depend on (vendor/operator-specific) definitions, configurations, or implementations. For example, an EM may be integrated into a NE, in which case an Itf-N interface between NE and NM may be applicable for NE-NM coordination.

Figure 2:
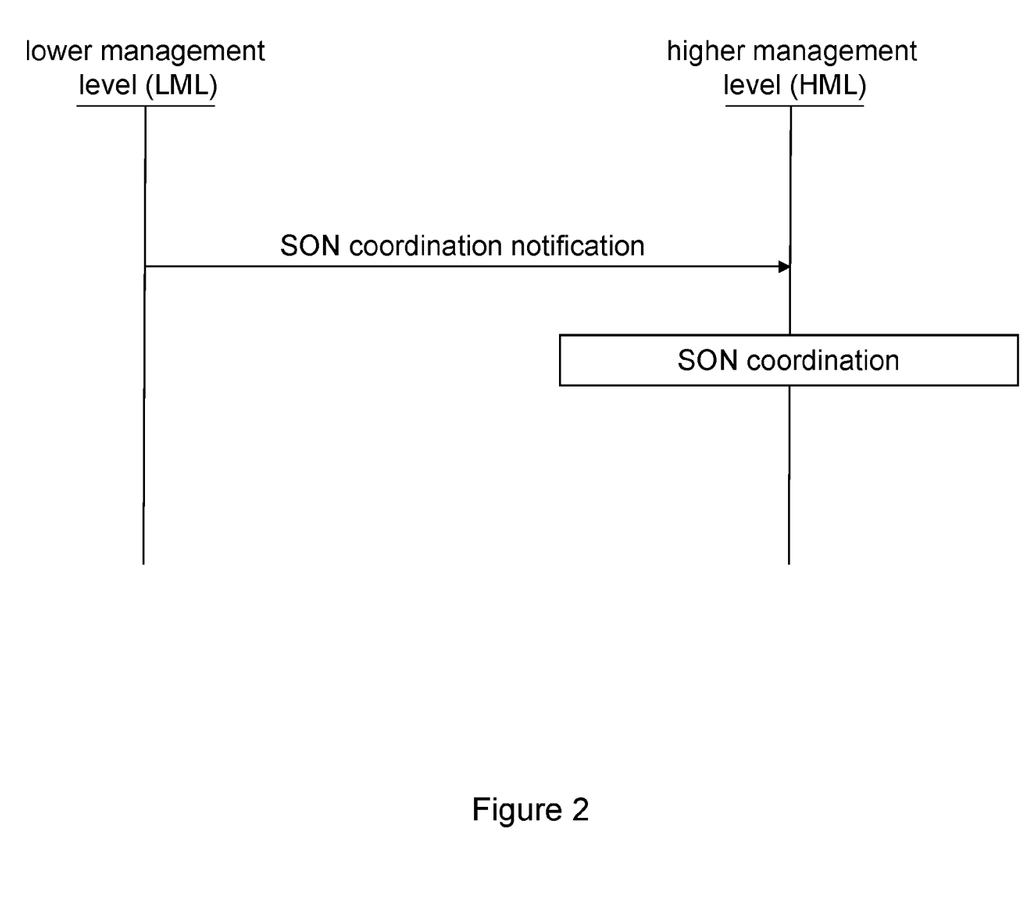
FIG. 2 shows a schematic diagram of an exemplary procedure according to exemplary embodiments of the present invention.

FIG. 2 shows a schematic diagram of an exemplary procedure according to exemplary embodiments of the present invention.

The exemplary procedure according to FIG. 2 is assumed to take place between a lower management level (LML), particularly a LML entity thereof, and a higher management level (HML), particularly a HML entity thereof. For potential mappings between the lower and higher management levels and network entities or levels in a SON architecture, reference is made to the above description in conjunction with FIG. 1.

As shown in FIG. 2, a procedure according to exemplary embodiments of the present invention comprises the following operations/functions.

The LML entity issues a notification for self-organizing network coordination, i.e. a SON coordination notification, which notifies an action of at least one SON function at the LML, to the HML. The HML entity receives the notification for self-organizing network coordination, i.e. the SON coordination notification, which notifies the action of the at least one SON function, from the LML, and coordinates the notified action in terms of SON coordination at the HML, i.e. performs SON coordination.

Such procedure according to exemplary embodiments of the present invention enables to expose any activity of the LML-level (e.g. NE or EM/DM-level) function to the HML (e.g. the NM) level.

According to exemplary embodiments of the present invention, the operation/function at the LML may be operable, i.e. the LML entity may be realized, at or by the at least one SON function and/or a SON coordination function, which may be located at any network entity in the lower management level of the underlying network, e.g. a NE and/or an EM/DM. The operation/function at the HML may be operable, i.e. the HML entity may be realized, at or by a SON coordination function, which may be located at any network entity in the higher management level of the underlying network, e.g. a NM.

According to exemplary embodiments of the present invention, the SON operation at the HML may comprise adding/collecting coordination-related information (from the LML), as derivable from the received SON coordination notification, to (locally) available coordination-related information at the HML and/or combining coordination-related information (from the LML), as derivable from the received SON coordination notification, with (locally) available coordination-related information (at the HML). The (locally) available coordination-related information at the HML may be previously collected information and/or recent information, as derivable from HML-internal SON (coordination) notifications. Then, any further SON-related operations/functions at the HML may be based on such added/collected and/or combined coordination information. Accordingly, by virtue of addition/collection and/or combination of coordination-related information originating from different management levels, a multi-level SON coordination may be practically realized.

According to exemplary embodiments of the present invention, the operations/functions according to FIG. 2 may be applicable to different SON coordination cases or behaviors. As explained below, such applicable SON coordination cases or behaviors may for example comprise a SON coordination request case or behavior (also referred to as pre-action coordination case or behavior) and a SON coordination information case or behavior (also referred to as post-action information case or behavior). In a SON coordination request case or behavior, a SON coordination decision for the action of the at least one SON function at the LML is requested from the HML, and in a SON coordination information case or behavior, the HML is informed about the action of the at least one SON function at the LML. Further details of such cases or behaviors are outlined below.

Figure 3:
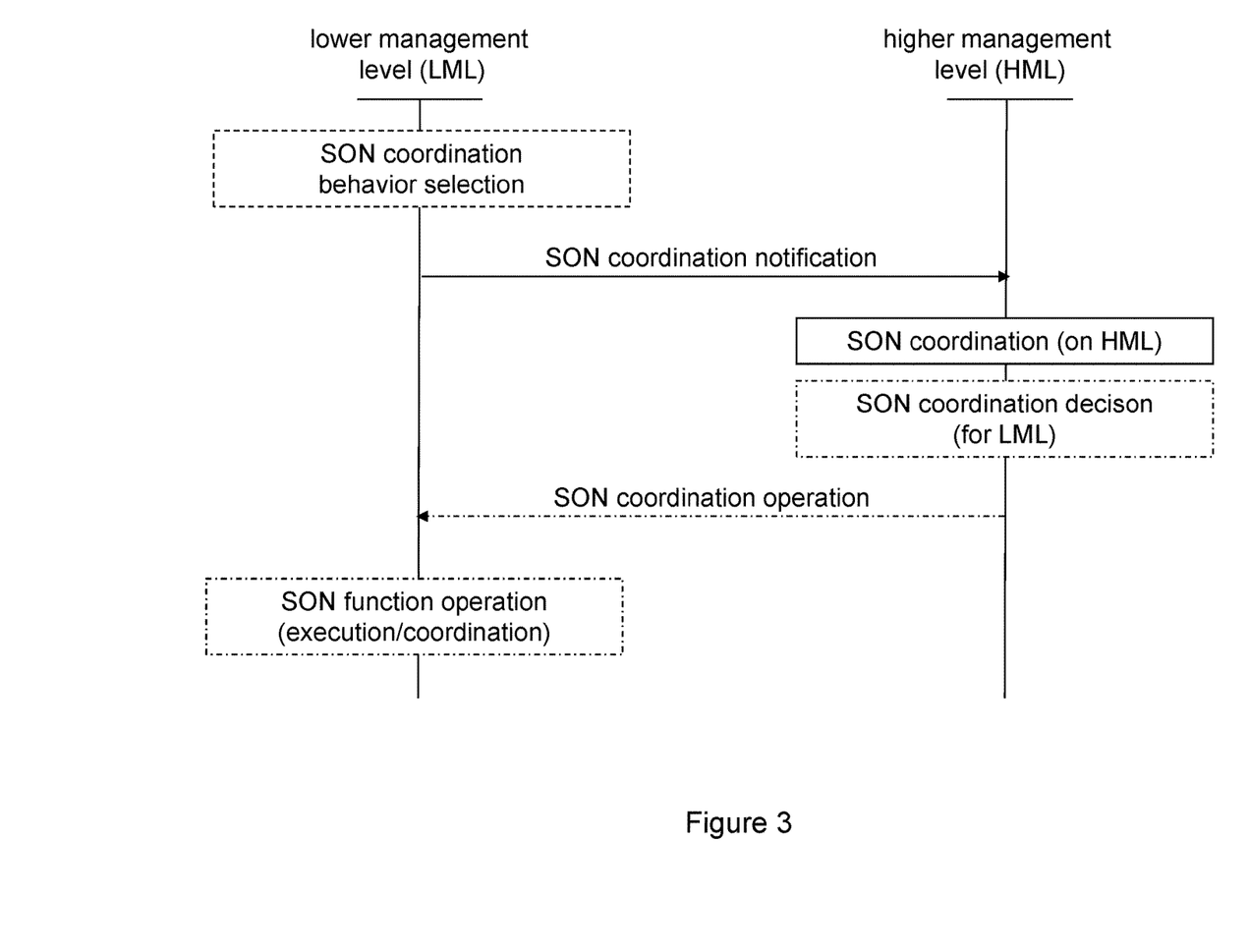
FIG. 3 shows a schematic diagram of exemplary variants of a procedure according to exemplary embodiments of the present invention.

FIG. 3 shows a schematic diagram of exemplary variants of a procedure according to exemplary embodiments of the present invention.

As shown in FIG. 3, a procedure according to exemplary embodiments of the present invention comprises the operations/functions of the procedure according to FIG. 2. In addition thereto, the procedure according to FIG. 3 comprises at least one of the following operations/functions. It is noted that, while both of such additional operations/functions are illustrated for the sake of simplicity in FIG. 3, they are inherently independent of each other.

Referring to the dash-dotted lines in FIG. 3, on the one hand, a procedure according to exemplary embodiments of the present invention comprises that the HML entity (upon receipt of the SON coordination notification) makes a SON coordination decision for the notified action at the LML, and issues an operation (i.e. a management operation) for SON coordination, i.e. a SON coordination operation, which includes the SON coordination decision for the action, to the LML. The SON coordination decision for the notified action at the LML may be made in consideration of the SON coordination at the HML. Then, the LML entity receives the operation (i.e. the management operation) for SON coordination, i.e. the SON coordination operation, which includes the SON coordination decision for the notified action, from the HML, and operates the at least one SON function at the LML according to the SON coordination decision for its notified action.

As used herein, a notification and operation (i.e. a management operation) represent messages being transferred via some interface, respectively.

Further, as used herein, a transferred operation (i.e. a management operation) may be construed to correspond or to be equivalent to any kind of instruction, command or directive for SON coordination and/or SON function operation at the LML.

According to exemplary embodiments of the present invention, the procedure according to any one of FIGS. 2 and 3 may be initiated upon being triggered in any conceivable manner. For example, issuance of the SON coordination notification and/or SON coordination case/behavior selection at the LML may be triggered e.g. when the LML determines any need or intention or desire for execution of at least one SON function and/or (multi-level) SON coordination in view thereof. Also, such trigger may reside in that the LML determines that some confirmation and/or coordination from the HML is needed or intended or desired.

According to exemplary embodiments of the present invention, the SON function operation at the LML may generally comprise execution and/or coordination of execution of the at least one action in question at/by the at least one SON function in question. Namely, the respective SON function/s is/are operated/executed accordingly, or the respective SON functions are coordinated to be operated/executed accordingly in a distributed way between the respective SON functions, when the LML entity is realized at or by the at least one SON function, while the respective SON function/s is/are coordinated to be operated/executed accordingly in a centralized way (within a domain, a DM, a EM, a NE, or the LML), when the LML entity is realized at or by a SON coordination function.

According to exemplary embodiments of the present invention, the SON coordination procedures over a SON coordination interface may be based on sort of master-slave operational principle, with the HML entity acting as a master and the LML entity acting as a slave. Namely, as evident from FIG. 3, the LML may notify the HML in terms of SON coordination, while the HML may perform SON coordination (at least at the HML) accordingly. In this regard, as mentioned above, the HML may add information from the LML-originated notification to collected information for SON coordination, and may combine the thus collected information for SON coordination purposes, including e.g.

making a SON coordination decision and distributing the decision (as a management operation) to the LML. Then, the LML may enforce the result of SON coordination (e.g. the HML-originated decision) for SON coordination purposes.

As outlined above, the operations/functions according to exemplary embodiments of the present invention, as illustrated in FIG. 3, may be applicable to different SON coordination cases or behaviors, e.g. a SON coordination request case or behavior and a SON coordination information case or behavior.

In the following, details of these two exemplarily applicable SON coordination cases or behaviors according to exemplary embodiments of the present invention are described.

As indicated above, in the pre-action coordination case or behavior, a SON function or a child coordination function (i.e. a SON coordination function in a parent-child relationship with a superordinate/higher-ranking parent coordination function at a higher level) asks for guidance before it performs an intended action, while in the post-action information case or behavior, a SON function or a child coordination function performs the action and informs the higher-level coordination function or parent coordination function (i.e. a SON coordination function in a parent-child relationship with a subordinate/lower-ranking parent coordination function at a lower level) about it.

In the SON coordination request case or behavior (i.e. the pre-action coordination case or behavior), the notified action relates to an intended action to be performed by the at least one SON function at the LML. Namely, the SON coordination in this case relates to an action which has not yet been performed.

In this case, the SON coordination notification comprises a SON coordination specific request, in which the intended action is notified, for which a SON coordination decision is requested from the HML. Accordingly, the SON coordination at the HML as well as the SON coordination decision and the SON coordination operation refer to the intended action, and the at least one SON function at the LML is operated for the intended action.

The SON coordination specific request comprises coordination-related profile information of the at least one self-organizing network function, in accordance with which the SON coordination decision is made.

Specifically, the SON coordination decision may correspond to either confirmation of the intended action or rejection of the intended action or (directing to) at least one action alternative to the intended action. When the SON coordination decision corresponds to confirmation of the intended action, the SON function operation at the LML may comprise performing and/or coordinating performing the intended action. When the SON coordination decision corresponds to rejection of the intended action, the SON function operation at the LML may comprise inhibiting (e.g. preventing, skipping, omitting, etc.) and/or coordinating inhibiting (e.g. preventing, skipping, omitting, etc.) the intended action. When the SON coordination decision corresponds to (directing to) at least one action alternative to the intended action, the SON function operation at the LML may comprise performing and/or coordinating performing the at least one alternative action (instead of the intended action).

Also, the SON coordination decision may correspond to undoing of the intended action. Namely, such undoing decision may relate to an earlier action (i.e. a previous notification or operation cycle) about which the HML (i.e. its coordination logic) has kept some state, and which may now (i.e. in response to a current SON coordination specific request with a newly requested action) be appropriate to be undone in view of the newly requested action In the SON coordination information case or behavior (i.e. the post-action information case or behavior), the notified action relates to a performed action having been performed by the at least one SON function at the LML. Namely, the SON coordination in this case relates to an action which has already been performed.

In this case, the SON coordination notification comprises a SON coordination specific information, in which the performed action is notified, about which the HML is informed for SON coordination based thereon. Accordingly, the SON coordination at the HML as well as, potentially (if applicable), the SON coordination decision and the SON coordination operation refer to the performed action, and the at least one SON function at the LML is operated with respect to or in view of the performed action.

In this case, no specific SON coordination decision for the LML and no corresponding SON coordination operation and SON function operation may be required. Namely, when the HML entity considers (in its SON coordination at the HML) that the performed action is acceptable and thus to be confirmed, the procedure may end without any further operations/functions. When the HML entity considers (in its SON coordination at the HML) that the performed action is not acceptable and thus not to be confirmed, the HML entity may make a SON coordination decision and issue a corresponding SON coordination operation, and the LML entity may operate the SON function/s accordingly.

Specifically, the SON coordination decision may correspond to one of (directing to) at least one action alternative to the performed action and undoing of the performed action. When the SON coordination decision corresponds to (directing to) at least one action alternative to the performed action, the SON function operation at the LML may comprise performing and/or coordinating performing the at least one alternative action (in addition to the previously performed action). When the SON coordination decision corresponds to undoing of the performed action (which may be basically equivalent to a rejection in the pre-action coordination case or behavior), the SON function operation at the LML may comprise undoing and/or coordinating undoing the performed action.

In the case of the SON coordination request case or behavior, the LML entity has to await the decision/operation from the HML entity, before the LML can act according to the decision/operation on the requested action. In case of the SON coordination information case or behavior, the LML entity may perform further actions by the same or different SON functions after issuance of the aforementioned post-action information notification, wherein such further actions may be subject to any one of the two SON coordination cases or behaviors, respectively. Such further action may for example be implementation specific.

According to exemplary embodiments of the present invention, the SON coordination specific request may be a notification in accordance with a (3GPP) template for operations/notifications. Specifically, the SON coordination specific request may be an instance of a dedicated information object class (IOC) for a notification for SON control and/or a SON coordination interface, such as e.g. a notifySONCoordinationRequest notification or the like.

Such notification allows an IRPAgent (i.e. a SON coordination (child) process or directly a SON function process, e.g. at the LML) to request a decision from an IRPManager (i.e. a SON coordination (parent) process, e.g. at the HML). Such notification of the SON coordination specific request may comprise one or more of the following information elements as input parameters (i.e. content or payload of the notification body).

Request ID (or requestId)

This information element is an identifier of the request instance, e.g. a related notifyRadioDataCompletionRequest notification. It may match an information notification Id.

This information element may represent a mandatory qualifier, for which the notification may be filtered, i.e. M, Y qualifiers.

Requesting SON Function (or requestingSONFunction)

This information element identifies the SON function or SON function type that requests coordination, e.g. HOO, LBO, CCO, etc. If the SON function (e.g. a kind of mega-SON function) treats several SON functions or SON function types, e.g. HOO and LBO, all of these SON functions or SON function types may be indicated or flagged in this information element.

This information element may represent a mandatory qualifier, for which the notification may be filtered, i.e. M, Y qualifiers.

SON Function Profile (or sonFunctionProfile)

This information element provides information about the SON function (or functions), as indicated by the aforementioned information element, that is important for the coordination, e.g., one or more of vendor, release xyz, priority, (followed) optimization target/s and its/their priority/priorities and/or weight/weights, current step/stage of operation, requesting time, envisioned impact area, targeted cell(s), envisioned impact time, and the like. Note that the impact area and the impact time can be further adjusted before making a decision, by the coordination function instance and/or another corresponding SON function instance based on their part of information), etc.

This information element may represent a mandatory qualifier, for which the notification may not be filtered, i.e. M, N qualifiers.

SON Intended Action (or sonIntendedAction)

This information element contains the intended action for/of the SON function (or SON functions), as indicated by the aforementioned information element, for which a (child) SON coordination process (or a SON function), e.g. at the LML, requests the (parent) SON coordination process, e.g. at the HML, for a decision on the intended action. The intended action parameter may comprise (or may consist of) some of the following information: action type (e.g. process invoking, parameter configuring, etc.), parameter for process invoking, parameter for configuration (chosen/optimal value and range for acceptable values), targeted cell(s), planned time of action, envisioned impact area, envisioned impact time (i.e. the time during which no other processes or reconfigurations within the impact area should be done), etc.

This information element may represent a mandatory qualifier, for which the notification may not be filtered, i.e. M, N qualifiers.

According to exemplary embodiments of the present invention, information of configuration data (of the SON function/s in question), which may be included e.g. in the above SON Intended Action element, may be extended by information about the time of the last change to the configuration parameter, how long it should not be changed again, and/or which SON target with which weight/priority was pursued with this last change. A new change (by way of SON coordination) may then only be allowed (e.g. by a SON coordination decision) when a sufficiently higher ranking SON target (e.g. in terms of priority and/r weight) is pursued by the change and/or when the no-change-timer has expired.

According to exemplary embodiments of the present invention, to inform the IRPAgent about the result of the SON coordination decision (e.g. the pre-action coordination request or the post-action coordination information), a new operation may be defined or a new support IOC may be defined, of which a create operation relays the information to the IRPAgent.

According to exemplary embodiments of the present invention, the SON coordination specific information may be a notification in accordance with a (3GPP) template for operations/notifications. Specifically, the SON coordination specific information may be an instance of a dedicated information object class (IOC) for a notification for SON control and/or a SON coordination interface, such as e.g. a notifyAttributeValueChange notification, a notifyObjectCreation notification, or a notifyObjectDeletion notification, or the like. Accordingly, post-action information may be accomplished by re-using or extending existing 3GPP notifications or by using existing 3GPP notifications as templates for SON coordination specific notifications.

Such notification allows an IRPAgent (i.e. a SON coordination (child) process or directly a SON function process, e.g. at the LML) to inform an IRPManager (i.e. a SON coordination (parent) process, e.g. at the HML) about a performed action. Such notification of the SON coordination specific information may comprise one or more of the following information elements as input parameters (i.e. content or payload of the notification body).

Information ID (or informationId)

This information element is an identifier of the information instance, e.g. a related notifyRadioDataCompletionRequest notification. It may match an information notificationId.

This information element may represent a mandatory qualifier, for which the notification may be filtered, i.e. M, Y qualifiers.

Informing SON Function (or informingSONFunction)

This information element identifies the SON function or SON function type that informs for coordination, e.g. HOO, LBO, CCO, etc. If the SON function (e.g. a kind of mega-SON function) treats several SON functions or SON function types, e.g. HOO and LBO, all of these SON functions or SON function types may be indicated or flagged in this information element.

This information element may represent a mandatory qualifier, for which the notification may be filtered, i.e. M, Y qualifiers.

Performed Action (or sonPerfomedAction)

This information element contains the performed action for/of the SON function (or SON functions), as indicated by the aforementioned information element, about which a (child) SON coordination process (or a SON function), e.g. at the LML, informs the (parent) SON coordination process, e.g. at the HML. The performed action parameter may comprise (or may consist of) some of the following information: action type (e.g. process invoking, parameter configuring, etc.), parameter for process invoking, parameter for configuration (chosen/optimal value and range for acceptable values), targeted cell(s), time of action, envisioned impact area, envisioned impact time (i.e. the time during which no other processes or reconfigurations within the impact area should be done), etc.

This information element may represent a mandatory qualifier, for which the notification may not be filtered, i.e. M, N qualifiers.

According to exemplary embodiments of the present invention, information of configuration data (of the SON function/s in question), which may be included e.g. in the above SON Performed Action element, may be extended by information about the time of the last change to the configuration parameter, how long it should not be changed again, and/or which SON target with which weight/priority was pursued with this last change. A new change (by way of SON coordination) may then only be allowed (e.g. by a SON coordination decision) when a sufficiently higher ranking SON target (e.g. in terms of priority and/r weight) is pursued by the change and/or when the no-change-timer has expired.

According to exemplary embodiments of the present invention, the SON coordination operation may be an operation in accordance with a (3GPP) template for operations/notifications. Specifically, the SON coordination operation may be an instance of a dedicated information object class (IOC) for an operation for SON control and/or a SON coordination interface, such as e.g. a SONCoordinationResult operation or the like.

Such operation allows an IRPManager (i.e. a SON coordination (parent) process, e.g. at the HML) to provide a decision on the notified action, i.e. the pre-action coordination request or to react on a post-action coordination information from the IRPAgent (i.e. a SON coordination (child) process or directly a SON function process, e.g. at the LML). Such SON coordination operation may comprise one or more of the following information elements as input parameters (i.e. content or payload of the operation body).

Request ID (or requestId)

This information element is an identifier of the related coordination notification, e.g. a request instance requesting pre-action coordination or an information instance providing pots-action information. It may match an information notificationId.

This information element may represent a mandatory qualifier, i.e. M qualifier.

SON Coordination Decision (or sonCoordinationDecision)

This information element contains the decision on the SON action in question, e.g. the intended action requested or the performed action informed by the (child) SON coordination function or, directly, by the relevant SON function instance.

This information element may further contain a decision time.

It may match an information out of Confirmation or Confirmed, Rejection or Rejected, AlternativeAction or OtherAction (or Directing), and Undoing or Undo. If the decision is Confirmation or Confirmed, which is possible for the pre-action coordination case or behavior, then the requested action can be executed or coordinated accordingly. If the decision is Rejection or Rejected, which is possible for the pre-action coordination case or behavior, then the requested action must not be executed or is to be coordinated accordingly. If the decision is AlternativeAction or OtherAction (or Directing), which is possible both for the pre-action coordination case or behavior and the post-action coordination information case or behavior, then the notified (at least one) action must be executed or is to be coordinated accordingly. If the decision is Undoing or Undo, which is possible for the post-action coordination information, then the described action must be undone or is to be coordinated accordingly. Note that the decision Undoing or Undo may also be possible for the pre-action coordination information, in which case it may refer to an earlier action (i.e. a previous notification or operation cycle) about which the coordination logic has kept some state, and which may now be appropriate to be undone in view of the newly requested action.

This information element may represent a mandatory qualifier, i.e. M qualifier.

Further, such SON coordination operation may comprise the following information element as output parameter.

Result

This information element confirms success of data reception by indicating result=success or informs about failure of data reception by indicating result=failure. It may match an information result.

This information element may represent a mandatory qualifier, i.e. M qualifier.

Referring to the dashed lines in FIG. 3, on the other hand, a procedure according to exemplary embodiments of the present invention comprises that the LML entity (before issuance of a SON coordination notification) selects one out of applicable different SON coordination cases or behaviors, such as the SON coordination request case or behavior or the SON coordination information case or behavior, as outlined above. Depending on such selection, the LML entity may issue a SON coordination specific request or a SON coordination specific information, and the further procedure may proceed accordingly, as outlined above.

According to exemplary embodiments of the present invention, such selection may be made on the basis of a default coordination behavior, and/or on at least one of a function basis and a cell basis in accordance with at least one self-organizing network control attribute. The at least one self-organizing network control attribute provides for additional control information enabling the LML entity to know whether it can act on its own and provide post-action information or whether it needs to request pre-action coordination. Such control information may be on SON function level, i.e. depending on the related SON function or functions (for example, "HOO always needs pre-coordination with LBO", "CCO needs post-coordination with HOO") or on specific target cell level, i.e. depending on one or more target cells of the SON function/functions or action/actions in question (for example, "CCO only needs pre-coordination when done at cells 1, 2, 3").

The selection between these two SON coordination cases or behaviors for coordination could be made as such:

the pre-action coordination case or behavior is applied, whenever a multi-domain/level-affecting action needs to be acknowledged by a (parent) SON coordination function at the HML before the action can be taken, and the post-action information case or behavior is applied, when (1) a multi-domain/level-affecting action does not require any immediate and direct decision from a (parent) SON coordination function at the HML, while its action notification would have effect to the further coordination decisions of the (parent) SON coordination function at the HML, and/or (2) a multi-domain/level-affecting action can be easily corrected with negligible damage to the network via a further coordination action (e.g. undo) decided and taken following the post-action information by a (parent) SON coordination function at the HML.

Further, a default behavior may be defined, e.g. to apply the post-action information case or behavior if no other explicit or implicit case/behavior selection took place or is to take place.

Such default behavior may be instructed by the HML or on a system level, and the LML may operate according to such HML/system-originated default behavior instruction. For SON coordination case/behavior selection at the LML or at system level, similar characteristics may apply, as outlined above for the exemplary scenario of SON coordination case/behavior selection at the LML.

In view of the optional nature of the case/behavior selection procedure at the LML, as mentioned above, it is noted that exemplary embodiments of the present invention encompass scenarios, systems and structures in which no such case/behavior selection procedure is carried out as well as scenarios, systems and structures in which such case/behavior selection procedure is carried out at another level or place, e.g. at the HML or at a system level. For example, according to exemplary embodiments of the present invention, the overall system may be (pre-)configured to operate with only one of the aforementioned SON coordination cases or behaviors, thus rendering unnecessary any such SON coordination case/behavior selection.

Generally, it is noted that the term "undo" or the like may equally be referred to e.g. as rollback or the like. Accordingly, as used herein, performing/coordinating undoing and performing/coordinating a rollback are to be construed as equivalents or synonyms.

According to exemplary embodiments of the present invention, such SON coordination case/behavior selection may be based on attributes in accordance with a (3GPP) specification. Specifically, such attributes may be an instance of a dedicated information object class (IOC) for SON control and/or a SON coordination interface, such as e.g. an IOC for switching on and off SON functions.

An attribute according to exemplary embodiments of the present invention, which enables selection on function level/basis, may be denoted as sONFunctionsForCoordinationOnFunctionLevel or the like, wherein its attribute constraint may be such that the condition is "SON coordination is supported". Its qualifier properties may be such that its (use as) support qualifier is subject to configuration management, its (use as) read qualifier is mandatory, and its (use as) write qualifier is mandatory.

The attribute sONFunctionsForCoordinationOnFunctionLevel or the like may be specified to define, for a specific SON function or a plurality of specific SON functions, whether post-action information coordination is to be applied (i.e. a post-action information notification is to be issued) or pre-action request coordination is to be applied (i.e. a pre-action request notification is to be issued).

Its legal values may comprise one or more of:
 a list of one or more SON functions or SON function groups and their assigned behavior, e.g. a list of elements SONcoordinationFunctionGroupAndBehaviour,
 any element SONcoordinationFunctionGroupAndBehaviour, a sequence {ListofSONfunction; SONcoordinationBehaviour}, wherein
 SONfunction indicates the SON function, such as HOO, LBO, CCO, RACHO, ANR . . . , and
 SONcoordinationBehaviour indicates one of postActionInformation and preActionCoordination.

An attribute according to exemplary embodiments of the present invention, which enables selection on cell level/basis, may be denoted as sONFunctionsForCoordinationOnCellLevel or the like, wherein its attribute constraint may be such that the condition is "SON coordination is supported". Its qualifier properties may be such that its (use as) support qualifier is subject to configuration management, its (use as) read qualifier is mandatory, and its (use as) write qualifier is mandatory.

The attribute sONFunctionsForCoordinationOnCellLevel or the like may be specified to define, for a (target) cell or a plurality of (target) cells, whether post-action information coordination is to be applied (i.e. a post-action information notification is to be issued) or pre-action request coordination is to be applied (i.e. a pre-action request notification is to be issued) for a SON function involving this/these (target) cell/cells.

Its legal values may comprise one or more of:
 a list of one or more cells (in connection with one or more SON functions or SON function groups) and their assigned behavior, e.g. a list of elements SONcoordinationFunctionCellListAndBehaviour,
 any element SONcoordinationFunctionCellListAndBehaviour, a sequence {SONfunction; ListofCells; SONcoordinationBehaviour}, wherein
 SONfunction indicates the SON function, such as HOO, LBO, CCO, RACHO, ANR . . . , and
 SONcoordinationBehaviour indicates one of postActionInformation and preActionCoordination.

The two aforementioned attributed may be used alone or in combination, respectively. If both attributed, e.g. sONFunctionsForCoordinationOnFunctionLevel and sONFunctionsForCoordinationOnCellLevel, contain information about the same SON function, then the information in sONFunctionsForCoordinationOnCellLevel prevails for the listed (target) cell or cells.

Figure 4:
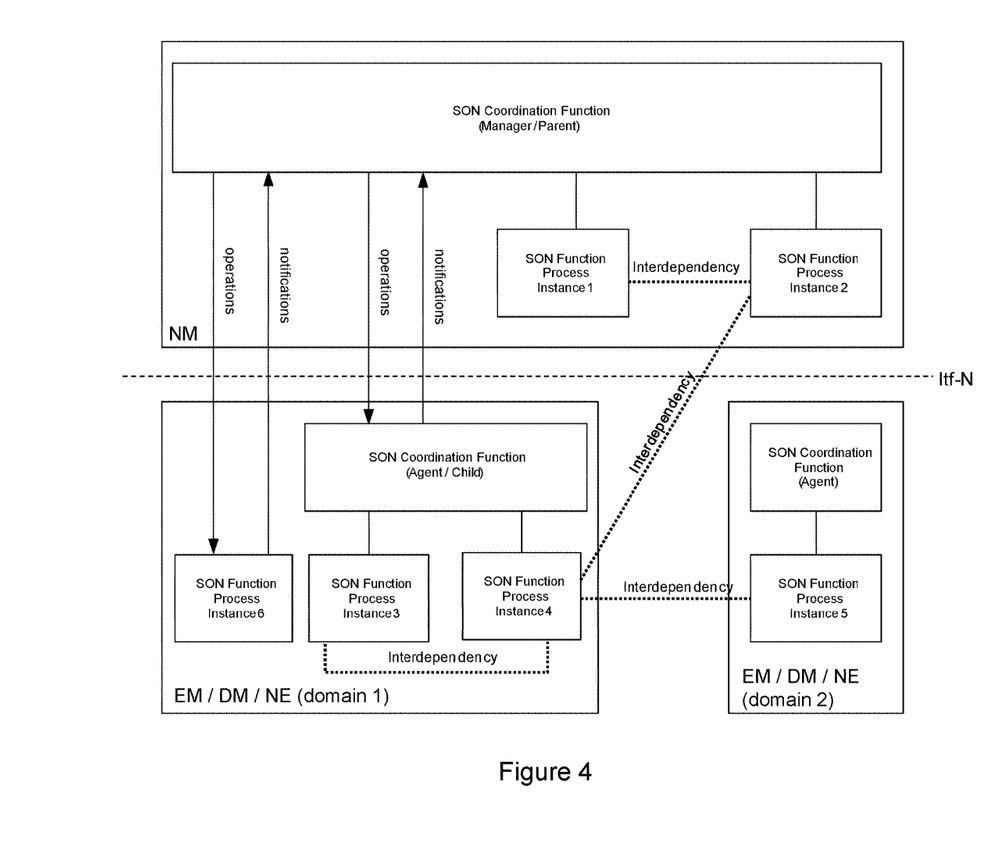
FIG. 4 shows a schematic diagram of an exemplary structure of multi-level self-organizing network coordination according to exemplary embodiments of the present invention.

FIG. 4 shows a schematic diagram of an exemplary structure of multi-level self-organizing network coordination according to exemplary embodiments of the present invention.

The structure of FIG. 4 is exemplarily based on the assumption that the NM level represents a higher management level of an underlying network, while the EM/DM/NE level (i.e. any one of the EM/DM level and/or the NE level) represents a lower management level of the underlying network. Alternatively, as outlined above, it may also be the case that the EM/DM level represents a higher management level of an underlying network, while the NE level represents a lower management level of the underlying network.

As shown in FIG. 4, this exemplary structure assumes that a NM entity contains a SON coordination function, which may represent an IRPManager entity, and each EM/DM/NE entity contains a SON coordination function, which may represent an IRPAgent entity. The SON coordination function in the NM entity and the SON coordination function in the EM/DM/NE entity of domain 1 may be in a parent-child relationship.

As indicated above, the LML-related operations/functions may be realized by a SON coordination function at the EM/DM/NE level, e.g. the SON coordination function in the EM/DM/NE entity of domain 1, or a SON function at the EM/DM/NE level, e.g. the SON function of process instance 6 in the EM/DM/NE entity of domain 1, while the HML-related operations/functions may be realized by a SON coordination function at the HML level, e.g. the SON coordination function at the NM entity.

In case of an LML-located SON function cooperating with the HML entity, the NM performs all coordination function activities (and the SON functions within a domain may e.g. coordinate between themselves in a distributed way), such as between process instances 3, 4 and 6 according to FIG. 4. In case of an LML-located SON coordination function cooperating with the HML entity, the EM/DM/NE performs coordination function activities for its coordinated SON functions, such as for process instances 3 and 4 according to FIG. 4.

Such multi-level coordination interface functionality according to exemplary embodiments of the present invention is indicated in FIG. 4 by the two pairs of arrows for notifications/operations between the LML (below the dashed line indicating the Itf-N interface) and the HML (above the dashed line indicating the Itf-N interface). Such multi-level coordination interface functionality according to exemplary embodiments of the present invention is effective for tackling cross-level and cross-domain interdependencies between some SON functions, as exemplarily indicated in FIG. 4.

It is noted that the SON coordination structure according to FIG. 4 is just for illustrative purpose by way of example. In particular, while FIG. 4 shows a structure in which a SON function at a LML (e.g. an EM/DM/NE level) directly cooperates with the HML entity and a SON coordination function cooperates with the HML entity for two other SON functions, another structure is also applicable. In another structure, the number of directly cooperating SON functions and coordinated SON functions at the LML (e.g. the EM/DM/NE level) may be different. Also, in another structure, all SON functions at a LML (e.g. an EM/DM/NE level) may be coordinated by one or more SON coordination functions, or all SON at a LML (e.g. an EM/DM/NE level) may directly coordinate with the HML entity.

Generally, pairs of terms such as master/slave, parent/child and manager/agent are used herein for referring to a hierarchy between different management levels and/or their respective entities/functions. Such pairs of terms are to be construed as equivalents or synonyms in the present specification. In particular, a relationship between a superordinate/higher-ranking SON coordination function (at a higher level) and a subordinate/lower-ranking SON coordination function (at a lower level) may be equally referred to herein as a master-slave relationship, a parent-child relationship, or a manager-agent relationship.

In view of the above, exemplary embodiments of the present invention provide for multi-level self-organizing network coordination facilitating an appropriate and effective SON coordination across different management levels and domains. Such multi-level self-organizing network coordination according to exemplary embodiments of the present invention provides for procedures and information elements and the like, which are effective for SON coordination across the standard OSS/AOM interfaces, i.e. at least one of the Itf-N interface and the Itf-S interface.

Accordingly, there are provided concrete multi-level self-organizing network coordination procedures, which facilitate transport of self-organizing network coordination information between different management levels.

Accordingly, there is provided a concrete multi-level coordination interface based on the principle for multi-vendor/release domain coordination, where a SON coordination function is assigned at each OSS/OAM management level (i.e. Network Element (NE) level, Element Management (EM) level and Network Management (NM) level). The interface procedure according to exemplary embodiments of the present invention is based on a "notification-operation" procedure, where a child or lower-level entity requests a parent or higher-level entity for a coordination decision for an intended action or informs it about a performed action, and the parent or higher-level entity may respond the child or lower-level entity with its decision accordingly, over the OSS/OAM interface.

According to exemplary embodiments of the present invention, the SON coordination function at the higher management level may serve as the parent (manager) of the SON coordination functions at the lower management level, and the SON coordination functions at the lower management level may serve as the child (agent) of the parent (manager) SON coordination function at the higher management level. The interface between a child (agent) and the parent (manager) is specified so that it may be defined over the OSS/AM interfaces (Itf-S and/or Itf-N interfaces).

The multi-level self-organizing network coordination (interface) according to exemplary embodiments of the present invention is applicable in any multi-vendor/release networks and/or any heterogeneous networks, as described above.

Further, the multi-level self-organizing network coordination (interface) according to exemplary embodiments of the present invention is applicable in any distributed, centralized or hybrid SON architecture. Referring to FIG. 1, the illustrated SON architecture would be a distributed SON architecture when only the EM/DMs (and/or the NEs) comprise SON functions, a centralized SON architecture when only the NM comprises SON functions, and a hybrid SON architecture when the EM/DMs (and/or the NEs) and the NM comprise SON functions. Anyway, as the multi-level self-organizing network coordination (interface) according to exemplary embodiments of the present invention enables distribution of (manageable) SON coordination functionality between NM, EM/DM, and NE, it is specifically suitable for a hybrid SON architecture.

The multi-level self-organizing network coordination (procedures/interface) according to exemplary embodiments of the present invention is applicable for coordination of any conceivable SON function or combination/interdependency between SON functions, including e.g. HOO, LBO, CCO, ANR, RACHO, and the like. In this regard, it is noted that HOO may equally be referred to e.g. as MRO, and LBO may be equally referred to e.g. as MLB.

Generally, when reference is made herein to a network manager, an element manager, a domain manager or a network element, a correspondingly functionality is actually meant, irrespective of the realization or implementation thereof. For example, a network/domain/element manager in the meaning of the present specification is to refer to any network/domain/element manager/managing functionality which may be realized or implemented as a standalone network entity, an integrated function in any network entity, a respective system integration, or the like, as long as it is exhibiting a corresponding functionality.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 5, while for the sake of brevity reference is made to the detailed description of respective corresponding schemes, methods and functionality, principles and operations according to FIGS. 1 to 4.

Figure 5:
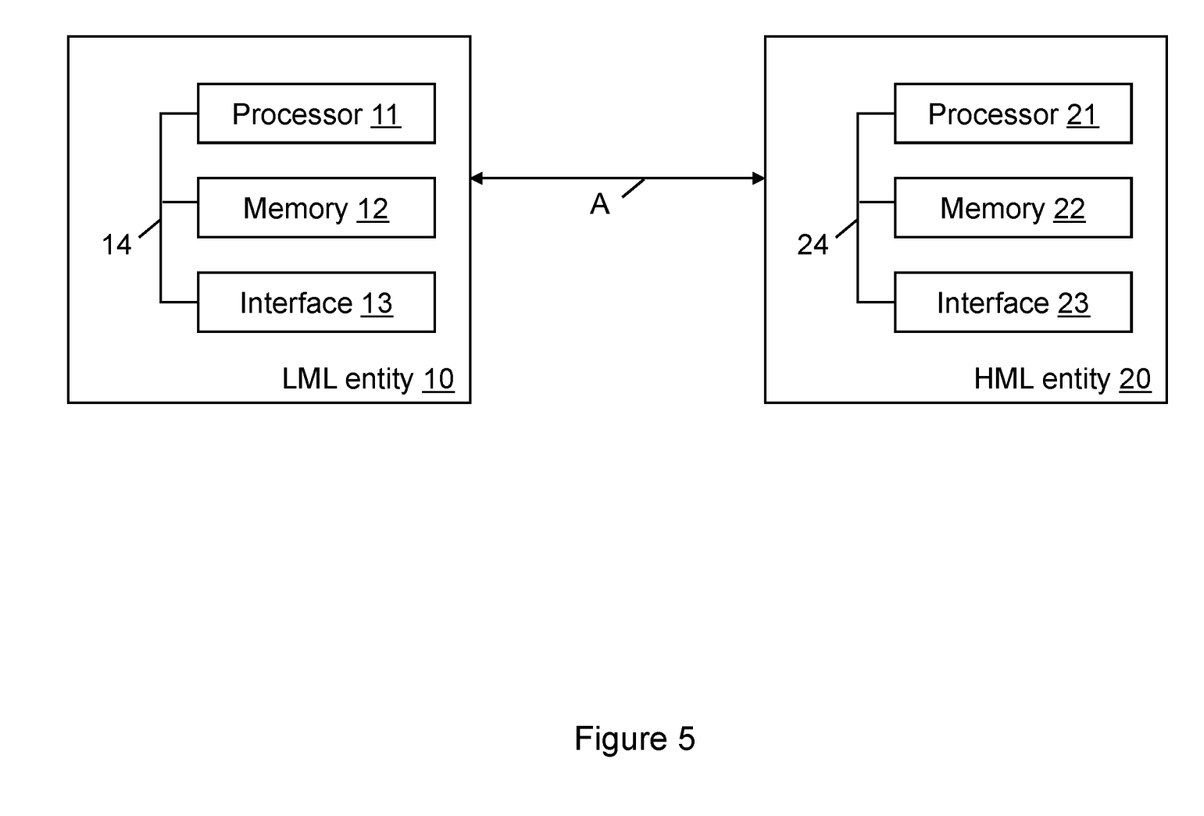
FIG. 5 shows a schematic diagram of exemplary apparatuses according to exemplary embodiments of the present invention.

In FIG. 5 below, the solid line blocks are basically configured to perform respective operations as described above. The entirety of solid line blocks are basically configured to perform the methods and operations as described above, respectively. With respect to FIG. 5, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 5, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 5 shows a schematic diagram of exemplary apparatuses of according to exemplary embodiments of the present invention.

In view of the above, the thus illustrated apparatuses 10 and 20 are suitable for use in practicing the exemplary embodiments of the present invention, as described herein.

The thus illustrated apparatus 10 may represent a (part of a) lower management level entity such as a NE (e.g. an eNB) or EM or DM of a cellular communication system or its underlying network (e.g. a modem thereof), and may be configured to exhibit an architectural relationship as evident from FIG. 1 and to perform a procedure and/or exhibit a functionality as evident from any one of FIGS. 2 to 4. The thus illustrated apparatus 20 may represent a (part of a) higher management level entity such as a EM or DM or NM of a cellular communication system or its underlying network (e.g. a modem thereof), and may be configured to exhibit an architectural relationship as evident from FIG. 1 and to perform a procedure and/or exhibit a functionality as evident from any one of FIGS. 2 to 4.

As indicated in FIG. 5, according to exemplary embodiments of the present invention, each of the apparatuses comprises a processor 11/21, a memory 12/22 and an interface 13/23, which are connected by a bus 14/24 or the like, and the apparatuses may be connected via link A, respectively.

The processor 11/21 and/or the interface 13/23 may also include a modem or the like to facilitate communication over a (hardwire or wireless) link, respectively. The interface 13/23 may include a suitable transceiver coupled to one or more antennas or communication means for (hardwire or wireless) communications with the linked or connected device(s), respectively. The interface 13/23 is generally configured to communicate with at least one other apparatus, i.e. the interface thereof.

The memory 12/22 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "processor configured to [cause the apparatus to] perform xxx-ing" is construed to be equivalent to an expression such as "means for xxx-ing").

In its most basic form, according to exemplary embodiments of the present invention, the apparatus 10 or its processor 11 is configured to perform issuing a notification for self-organizing network coordination, which notifies an action of at least one self-organizing network function at a lower management level, from the lower management level of a self-organizing network to a higher management level of the self-organizing network.

Accordingly, stated in other words, the apparatus 10 may comprise respective means for issuing.

As outlined above, the apparatus 10 may comprise respective means for receiving and means for operating, and/or means for selecting.

In its most basic form, according to exemplary embodiments of the present invention, the apparatus 20 or its processor 21 is configured to perform receiving a notification for self-organizing network coordination, which notifies an action of at least one self-organizing network function at a lower management level, from the lower management level of a self-organizing network at a higher management level of the self-organizing network, and coordinating the notified action in terms of self-organizing network coordination at the higher management level.

Accordingly, stated in other words, the apparatus 20 may comprise respective means for receiving and means for coordinating.

As outlined above, the apparatus 20 may comprise respective means for making a decision and means for issuing.

As mentioned above, exemplary embodiments of the present invention encompass various configurations of management levels. For example, the lower management level may be an element or domain manager level and the higher management level may be a network manager level, or the lower management level may be a network element level and the higher management level may be an element or domain manager level, or the lower management level may be a network element level and the higher management level may be a network manager level.

For further details regarding the operability/functionality of the individual apparatuses, reference is made to the abode description in connection with any one of FIGS. 1 to 4, respectively.

According to exemplarily embodiments of the present invention, the processor 11/21, the memory 12/22 and the interface 13/23 may be implemented as individual modules, chips, chipsets, circuitries or the like, or one or more of them can be implemented as a common module, chip, chipset, circuitry or the like, respectively.

According to exemplarily embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for realizing multi-level self-organizing network coordination, including self-organizing network coordination procedures. Such measures exemplarily comprise communication of a notification for self-organizing network coordination, which notifies an action of at least one self-organizing network function at a lower management level, from the lower management level of a self-organizing network to a higher management level of the self-organizing network, either before the action is actually performed or after the action has actually been performed, and coordination of the notified action in terms of self-organizing network coordination at the higher management level.

The measures according to exemplary embodiments of the present invention may be applied for any kind of network environment, such as for example for communication systems in accordance with 3GPP RAN1/RAN2/RAN3 standards, i.e. LTE standards of release 10/11/12/ . . . (including LTE-Advanced and its evolutions) and/or UMTS standards, and/or WCDMA standards.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
ANR Automatic Neighbor Relation
CCO Capacity and Coverage Optimization
DM Domain Management/Manager
EM Element Management/Manager
eNB evolved NodeB
HML Higher Management Level
HOO Handover Optimization
IOC Information Object Class
IRP Integration Reference Point
LBO Load Balancing Optimization
LML Lower Management Level
LTE Long Term Evolution
MLB Mobility Load Balancing
MRO Mobility Robustness Optimization
NE Network Element
NM Network Management/Manager
OAM Operation And Maintenance
OSS Operations Support System
RACHO Random Access Channel Optimization
RAT Radio Access Technology
SON Self-Organizing Network
UMTS Universal Mobile Telecommunications System
WCDMA Wideband Code Division Multiple Access

The invention claimed is:

1. A method comprising
issuing from a lower management level comprising a network element, first element manager or first domain manager of a self-organizing network, a notification for self-organizing network coordination notifying an action of at least one self-organizing network function at the lower management level, to a higher management level comprising a second element manager, second domain manager or network manager of the self-organizing network, the notification includes coordination-related profile information and an intended action parameter of an intended action of the at least one self-organizing network function; and
receiving from the higher management level, a self-organizing network coordination decision for the intended action, the self-organizing network coordination decision corresponding to either a confirmation of the intended action, rejection of the intended action, or at least one action alternative to the intended action,
wherein the coordination-related profile information of the at least one self-organizing network function includes at least one of vendor, release information, priority, optimization target, optimization target priority, optimization target weight, current step/stage of operation, requesting time, envisioned impact area, targeted cell(s), and envisioned impact time, wherein the intended action parameter includes at least one of a process invoking action type, a parameter configuration action type, a parameter for process invoking, parameter for configuration of chosen or optimal value, a parameter for configuration of a range of accepted values, targeted cell(s), planned time of action, envisioned impact area, envisioned impact time, and information of configuration data, wherein the information of configuration data includes information about a time of a last change to a configuration parameter, length of time that the configuration data remains unchanged, or which self-organizing network with which weight/priority was pursued with the last change, wherein the notification comprises a self-organizing network coordination specific request, in which the notified action is an intended action intended to be performed by the at least one self-organizing network function at the lower management level, for which the self-organizing network coordination decision is requested from the higher management level, wherein the method further comprises operating the at least one self-organizing network function at the lower management level according to the self-organizing network coordination decision for its intended action, and wherein the operating comprises one of:

performing and/or coordinating performing the intended action by the at least one self-organizing network function at the lower management level, when the self-organizing network coordination decision corresponds to the confirmation of the intended action, inhibiting and/or coordinating inhibiting the intended action by the at least one self-organizing network function at the lower management level, when the self-organizing network coordination decision corresponds to the rejection of the intended action, and performing and/or coordinating performing at least one alternative action by the at least one self-organizing network function at the lower management level, when the self-organizing network coordination decision corresponds to the at least one action alternative to the intended action.

2. The method according to claim 1, wherein
the notification comprises a self-organizing network coordination specific information, in which the notified action is a performed action having been performed by the at least one self-organizing network function at the lower management level, about which the higher management level is informed for self-organizing network coordination based thereon.

3. The method according to claim 2, further comprising wherein
receiving an operation for self-organizing network coordination, which includes a self-organizing network coordination decision for the performed action, from the higher management level, and
operating the at least one self-organizing network function at the lower management level according to the self-organizing network coordination decision for its performed action.

4. The method according to claim 3, wherein the operating comprises one of:

performing and/or coordinating performing at least one alternative action by the at least one self-organizing network function at the lower management level, when the self-organizing network coordination decision corresponds to at least one action alternative to the performed action, and undoing and/or coordinating undoing the performed action by the at least one self-organizing network function at the lower management level, when the self-organizing network coordination decision corresponds to undoing of the performed action.

5. The method according to claim 1, further comprising
selecting a self-organizing network coordination behavior between a self-organizing network coordination request behavior, in which a self-organizing network coordination decision for the action of the at least one self-organizing network function is requested from the higher management level, and a self-organizing network coordination information behavior, in which the higher management level is informed about the action of the at least one self-organizing network function, on at least one of a function basis and a cell basis in accordance with at least one self-organizing network control attribute, and/or on the basis of a default coordination behavior.

6. The method according to claim 1, wherein
the lower management level is an element or domain manager level and the higher management level is a network manager level, or
the lower management level is a network element level and the higher management level is an element or domain manager level, or
the lower management level is a network element level and the higher management level is a network manager level.

7. The method according to claim 1, wherein
the method is operable in a self-organizing network, and/or
the method is operable at or by a network element entity and/or an element manager entity, and/or
the method is operable at or by the at least one self-organizing network function and/or a self-organizing network coordination function at the lower management level, and/or the lower management level and the higher management level correspond to respective levels of an operations support system and/or respective operation and maintenance levels of a communication system, and/or
the lower management level and the higher management level are linked over at least one of an Itf-N interface and an Itf-S interface.

8. An apparatus comprising
an interface configured to communicate with at least another apparatus,
a memory configured to store computer program code, and
a processor configured to cause the apparatus to perform:
issuing from a lower management level comprising a network element, first element manager or first domain manager of a self-organizing network, a notification for self-organizing network coordination notifying an action of at least one self-organizing network function at the lower management level, to a higher management level comprising a second element manager, second domain manager or network manager of the self-organizing network, the notification includes coordination-related profile information and an intended action parameter of an intended action of the at least one self-organizing network function; and receiving from the higher management level, a self-organizing network coordination decision for the intended action, the self-organizing network coordination decision corresponding to either a confirmation of the intended action, rejection of the intended action, or at least one action alternative to the intended action, wherein the coordination-related profile information of the at least one self-organizing network function includes at least one of vendor, release information, priority, optimization target, optimization target priority, optimization target weight, current step/stage of operation, requesting time, envisioned impact area, targeted cell(s), and envisioned impact time, wherein the intended action parameter includes at least one of a process invoking action type, a parameter configuration action type, a parameter for process invoking, parameter for configuration of chosen or optimal value, a parameter for configuration of a range of accepted values, targeted cell(s), planned time of action, envisioned impact area, envisioned impact time, and information of configuration data, wherein the information of configuration data includes information about a time of a last change to a configuration parameter, length of time that the configuration data remains unchanged, or which self-organizing network with which weight/priority was pursued with the last change, wherein the notification comprises a self-organizing network coordination specific request, in which the notified action is an intended action intended to be performed by the at least one self-organizing network function at the lower management level, for which the self-organizing network coordination decision is requested from the higher management level, wherein the apparatus is further configured to perform operating the at least one self-organizing network function at the lower management level according to the self-organizing network coordination decision for its intended action, and wherein the apparatus is further configured to perform the operating by one of:

performing and/or coordinating performing the intended action by the at least one self-organizing network function at the lower management level, when the self-organizing network coordination decision corresponds to the confirmation of the intended action, inhibiting and/or coordinating inhibiting the intended action by the at least one self-organizing network function at the lower management level, when the self-organizing network coordination decision corresponds to the rejection of the intended action, and performing and/or coordinating performing at least one alternative action by the at least one self-organizing network function at the lower management level, when the self-organizing network coordination decision corresponds to the at least one action alternative to the intended action.

9. The apparatus according to claim 8, wherein the notification comprises a self-organizing network coordination specific information, in which the notified action is a performed action having been performed by the at least one self-organizing network function at the lower management level, about which the higher management level is informed for self-organizing network coordination based thereon.

10. The apparatus according to claim 9, configured to perform:

receiving an operation for self-organizing network coordination, which includes a self-organizing network coordination decision for the performed action, from the higher management level, and operating the at least one self-organizing network function at the lower management level according to the self-organizing network coordination decision for its performed action.

11. The apparatus according to claim 10, configured to perform operating by one of:

performing and/or coordinating performing at least one alternative action by the at least one self-organizing network function at the lower management level, when the self-organizing network coordination decision corresponds to at least one action alternative to the performed action, and undoing and/or coordinating undoing the performed action by the at least one self-organizing network function at the lower management level, when the self-organizing network coordination decision corresponds to undoing of the performed action.

12. The apparatus according to claim 8, configured to perform:

selecting a self-organizing network coordination behavior between a self-organizing network coordination request behavior, in which a self-organizing network coordination decision for the action of the at least one self-organizing network function is requested from the higher management level, and a self-organizing network coordination information behavior, in which the higher management level is informed about the action of the at least one self-organizing network function, on at least one of a function basis and a cell basis in accordance with at least one self-organizing network control attribute, and/or on the basis of a default coordination behavior.

13. The apparatus according to claim 8, wherein the lower management level is an element or domain manager level and the higher management level is a network manager level, or the lower management level is a network element level and the higher management level is an element or domain manager level, or the lower management level is a network element level and the higher management level is a network manager level.

14. The apparatus according to claim 8, wherein the apparatus is operable in a self-organizing network, and/or the apparatus is operable as or at a network element entity and/or an element manager entity, and/or the apparatus is operable as or at the at least one self-organizing network function and/or a self-organizing network coordination function at the lower management level, and/or the lower management level and the higher management level correspond to respective levels of an operations support system and/or respective operation and maintenance levels of a communication system, and/or the lower management level and the higher management level are linked over at least one of an Itf-N interface and an Itf-S interface.

\* \* \* \* \*